(12) United States Patent
Manzardo

(10) Patent No.: US 6,452,946 B1
(45) Date of Patent: Sep. 17, 2002

(54) APPARATUS AND METHOD FOR IMPROVING PERFORMANCE IN MASTER AND SLAVE COMMUNICATIONS SYSTEMS

(75) Inventor: Marcel Manzardo, Los Gatos, CA (US)

(73) Assignee: Siemens Information and Communications Network, Inc., Boca Raton, FL (US)

( * ) Notice: Subject to any disclaimer, the term of this patent is extended or adjusted under 35 U.S.C. 154(b) by 0 days.

(21) Appl. No.: 09/326,734

(22) Filed: Jun. 4, 1999

(51) Int. Cl.$^7$ ................................ H04J 1/00
(52) U.S. Cl. ...................... 370/487; 370/352
(58) Field of Search ................ 370/487, 490, 370/493, 532, 535, 537, 543, 391, 352, 358

(56) References Cited

U.S. PATENT DOCUMENTS

| | | | |
|---|---|---|---|
| 4,736,409 A | 4/1988 | Hasegawa et al. | 379/269 |
| 5,093,827 A | 3/1992 | Franklin et al. | 370/60.1 |
| 5,274,634 A | 12/1993 | Babiarz | 370/60 |
| 5,323,392 A | 6/1994 | Ishii et al. | 370/79 |
| 5,734,645 A | 3/1998 | Raith et al. | 370/329 |
| 5,892,910 A * | 4/1999 | Safadi | 395/200.47 |
| 6,363,086 B1 * | 3/2002 | Lindqvist et al. | 370/527 |

FOREIGN PATENT DOCUMENTS

| | | | |
|---|---|---|---|
| EP | 0511744 | 11/1992 | H04L/1/00 |
| JP | 1-129695 | 5/1989 | H04Q/3/58 |
| WO | WO 85/05241 | 11/1985 | H04Q/11/04 |

* cited by examiner

Primary Examiner—Wellington Chin
Assistant Examiner—Brenda Pham

(57) ABSTRACT

A method and a system for improving the exchange of data between a master system and multiple slave systems involves bundling multiple abbreviated messages into a single frame and transmitting the single frame across a long delay communications link. The abbreviated messages do not comply with a given transmission protocol such as high-level data link control (HDLC), while the single frame does comply with the transmission protocol. The abbreviated messages are then used to build multiple protocol-compliant frames that are sequentially transmitted across short delay communications links. By bundling multiple abbreviated messages into a single frame, the number of frame transmissions required across the long delay communications link is minimized, while the sequential transmission of protocol-compliant frames to and from the slave systems is accomplished.

20 Claims, 9 Drawing Sheets

APPARATUS AND METHOD FOR IMPROVING PERFORMANCE IN MASTER AND SLAVE COMMUNICATIONS SYSTEMS

FIELD OF THE INVENTION

The invention relates generally to master and slave communications systems, and more particularly to a technique for exchanging data between a master system and multiple slave systems.

BACKGROUND OF THE INVENTION

Master and slave communications systems exist in many forms. FIG. 1 is a depiction of an exemplary master and slave communications system 10 that has a main controller 12 acting as the master system and various peripherals 16, 18, and 20 acting as the slave systems. The peripherals are remote to the main controller, but are connected to the main controller via a remote node 14. The node 14 is located at the same site 21 as the peripherals, and functions to minimize the number of connections that are required between the main controller and the peripherals. The connection 22 between the main controller and the remote node can be through a direct cable connection or the connection can be made through a network such as an intranet or the Internet. An application for the master and slave communications system as shown in FIG. 1 is a campus communications system having a main PBX that handles many of the communications functions of the campus and having remote nodes that support the operation of devices such as telephones, fax machines, printers and computers.

FIG. 2 is an expanded view of a remote node 24 that is connected to a main PBX 26 as described with reference to FIG. 1. The remote node includes three line shelves 28, 30, and 32, with each line shelf having the capacity to support sixteen line cards 34, 36, 38, and 40. The line cards in FIG. 2 represent the peripherals 16, 18, and 20 in FIG. 1. The line cards typically have the ability to support up to twenty-four terminal devices (i.e., telephone, fax, printer, computer, etc.). In the system of FIG. 2, the main PBX is the master system and the line cards are the slave systems.

At the data link layer, or layer 2, of the open systems interconnection (OSI) model, the main PBX 26 and the line cards 34–36 communicate with each other using protocols such as binary synchronous control (BSC), synchronous data link control (SDLC), or high-level data link control (HDLC). The data link layer protocols are intended to ensure error-free and reliable point-to-point transmissions of data. When errors do occur in the transmission of data, the data link layer protocols initiate the retransmission and/or correction of the errors.

In systems such as the one shown in FIG. 2, the main PBX 26 is continuously exchanging frames of data with the line cards 34–40 (peripherals). The exchange of data may include determining the status of the line cards or exchanging data such as real-time voice conversations, e-mail messages, voice mail messages, FAX data, printer data, etc. For example, the main PBX may signal the line cards to determine if the line cards can receive data or if the line cards need to send data to the main PBX. In another example, the main PBX may transfer printer data to a line card that will be used by an attached printer to generate a document. Referring specifically to line shelf one 28, frames of data are continuously being sent back and forth between the main PBX and the sixteen line cards. The frames are exchanged in a sequential manner, and before the main PBX can exchange frames with the next line card, the main PBX must wait to receive a response from the current line card.

FIG. 3 is an example of an exchange of frames that takes place according to HDLC protocol between the main PBX 26 and the sixteen line cards 34–40 shown in FIG. 2. A polling frame (POLL) 46 is first transmitted from the main PBX to line card one, and in response a receive ready (RR), or acknowledgment, frame 48 is transmitted from line card one to the main PBX. Next, a polling frame 50 is transmitted from the main PBX to line card two 36 and an information frame (I-Fr) 52 is transmitted back to the main PBX in response. The main PBX responds to the information frame with a receive ready frame 54 to complete the transmission. Next, the main PBX transmits an information frame 56 to line card three and a receive ready frame 58 is transmitted back to the main PBX in response. Shown as an example, if a polling frame 60 receives no response because a line card is removed or malfunctioning, a time-out 62 may be triggered after a time-out period (e.g., 2 ms) has expired. The sequential exchange of frames continues through all sixteen line cards to complete one exchange cycle. Possible transaction times are shown on the time-line at the left side of the figure. In the example shown, one signaling cycle through a sixteen-card line shelf takes approximately ten milliseconds, as denoted by the right-side time-line.

Because frames of data must be exchanged sequentially and bidirectionally between the main PBX 26 and the line cards 34–40, a minimum of thirty-two transmissions are performed between the main PBX and the remote node 24 in one exchange cycle. The total time required to complete one exchange cycle is at least thirty-two times the time required to transmit one frame from the main PBX to the remote node. The sequential nature of the signaling between the main PBX and the line cards makes the system extremely sensitive to transmission delays that occur between the main PBX and the line cards. When the distance between the main PBX and the line cards is relatively great, the likelihood of transmission delay increases. In delay-sensitive communications systems, such as communications systems carrying real-time voice and/or video data, the main PBX and line cards are required to be relatively close to each other in order to maintain the quality of the transmitted data. However, in many situations it is advantageous to locate remote nodes far from the main PBX such that delay problems become quite likely.

As a result of the need to locate remote nodes at a relatively long distance away from the main PBX, there is still a need for a communications system that can exchange time-critical data between a master system and multiple slave systems in a timely manner, even though the master and slave systems are separated by a communications link that may exhibit significant delay.

SUMMARY OF THE INVENTION

A method and a system for improving the exchange of data between a master system and multiple slave systems involve bundling multiple abbreviated messages into a single frame and transmitting the single frame across a long delay communications link. The abbreviated messages do not comply with a given transmission protocol, but the single frame does. At the receiving end, the abbreviated messages are extracted from the single frame to build multiple protocol-compliant frames that are sequentially transmitted across relatively short delay communications links to the individual slave systems. By bundling multiple abbreviated messages into a single frame, the number of frame transmissions required across the long delay communications link is significantly reduced.

In a preferred embodiment, the master and slave communications system includes a main PBX and a remote node that communicate at the data link layer of the OSI model according to the high-level data link control (HDLC) protocol. The main PBX includes a main HDLC controller, while the remote node includes a remote HDLC controller and sixteen line cards on each of three line shelves. The main PBX is preferably connected to the public switched telephone network (PSTN), although this is not critical to the invention.

The main HDLC controller is a subsystem that generates combined-message frames which are transmitted according to HDLC protocol to the remote node. A combined-message frame is formed by combining, or bundling, address-specific messages together into an information field of the combined-message frame. The address-specific messages are generated by the main HDLC controller and, in a preferred embodiment, represent an abbreviated version of the data that is necessary to generate complete address-specific polling, acknowledge and information frames for respective line cards at the remote node. The complete address-specific frames comply with the HDLC frame protocol, while the address-specific messages do not comply with HDLC frame protocol.

The combined-message frames include all of the standard HDLC protocol fields, with the information field containing all of the address-specific messages. In the preferred embodiment, one combined-message frame is embedded with one address-specific message for each of the sixteen line cards on a line shelf. Each address-specific message, representing either a poling, an acknowledge, or an information frame, preferably includes an HDLC address field, a message type field, an unused field, and optional byte count and l-frame data fields. The HDLC address field identifies the HDLC address of the target line card. The type field identifies the type of frame associated with the target line card. As mentioned above, the preferred HDLC frame types include polling frames, acknowledge frames, and information frames. The unused field can be customized for various particular uses. The byte count and l-frame data fields are utilized when user-specific data is to be transmitted.

The remote HDLC controller, located within the remote node, receives combined-message frames from the main PBX and transmits new combined-message frames back to the main PBX in response. In addition to receiving and transmitting combined-message frames, the remote HDLC controller utilizes the received address-specific messages (representing the polling, acknowledge, and information frames) to generate address-specific frames targeted for the line cards and conversely uses address-specific frames from the line cards to generate address-specific messages. To generate an address-specific frame from an address-specific message, the remote HDLC controller examines the HDLC address field of a message to determine the target line card. The remote HDLC controller also examines the type field to determine whether the frame to be transmitted is a polling, acknowledge, or information frame. The remote HDLC controller then creates the flag, address, control, information, and error check fields required for a standard HDLC frame. The process of generating address-specific messages from an address-specific frame is basically the reverse of the above-described process.

Overall operation of the system for performing data link layer communications between the main PBX and the line cards utilizing HDLC protocol involves the main HDLC controller generating a first combined-message frame that includes multiple address-specific messages. The address-specific messages identify which type of HDLC frame (polling, acknowledge, or information) is to be sent to each line card. If an information frame is to be sent, then the specific data is included in the message. The first combined-message frame is transmitted from the main HDLC controller to the remote HDLC controller over the relatively long delay communications link. The remote HDLC controller, within the remote node, receives the first combined-message frame and utilizes the address-specific messages embedded within the combined-message frame to build the address-specific frames for each one of the line cards.

After the remote HDLC controller builds the first address-specific frame for the first line card, the address-specific frame is sent to the first line card over a short delay communications link. A second address-specific frame is returned to the remote HDLC controller from the line card in response to the received HDLC frame. For example, the remote HDLC controller may send an information frame to line card one, and line card one may send an acknowledge frame to the remote HDLC controller in response. The remote HDLC controller then utilizes the returned address-specific frame as a trigger to generate the next address-specific message. After completion of the exchange of polling, acknowledge, or information frames between the remote HDLC controller and the first line card, the process is repeated in a sequential manner for line cards two through sixteen. The sequential exchange of the HDLC-compliant polling, acknowledge and information frames between the remote HDLC controller and sixteen line cards is relatively quick, because of the short delay links between the remote HDLC controller and the line cards. Additionally, there is no processing delay between receiving a response frame from a peripheral and the transmission of the address-specific message.

When the last address-specific frame is received by the remote HDLC controller from the sixteen line cards, the remote HDLC controller generates the last address-specific message. The HDLC controller builds a second combined-message frame by combining all of the address-specific messages for the sixteen line cards into the information field of the second combined-message frame. The second combined-message frame complies with HDLC protocol and is transmitted from the remote node to the main PBX over the long delay communications link, thus completing one exchange cycle. By bundling abbreviated versions of the information that is to be communicated between the main PBX and the line cards into combined-message HDLC frames, the number of frames transmitted over the long delay communications link is minimized and frame transmissions over the short delay communications links are maximized, thus improving overall system performance.

DETAILED DESCRIPTION

Figure 1:
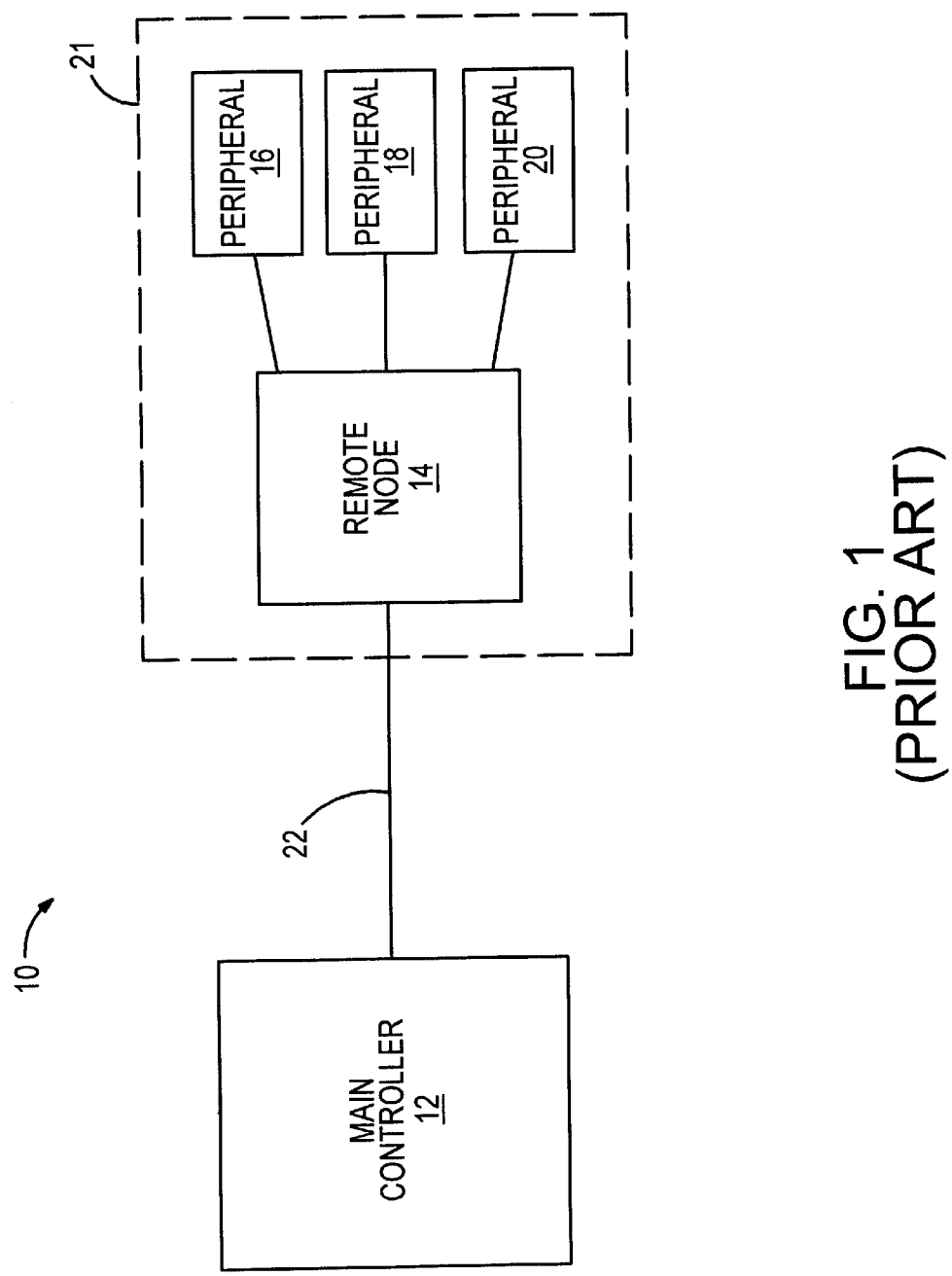
FIG. 1 is a depiction of an exemplary master and slave communications system in accordance with the prior art.
Figure 2:
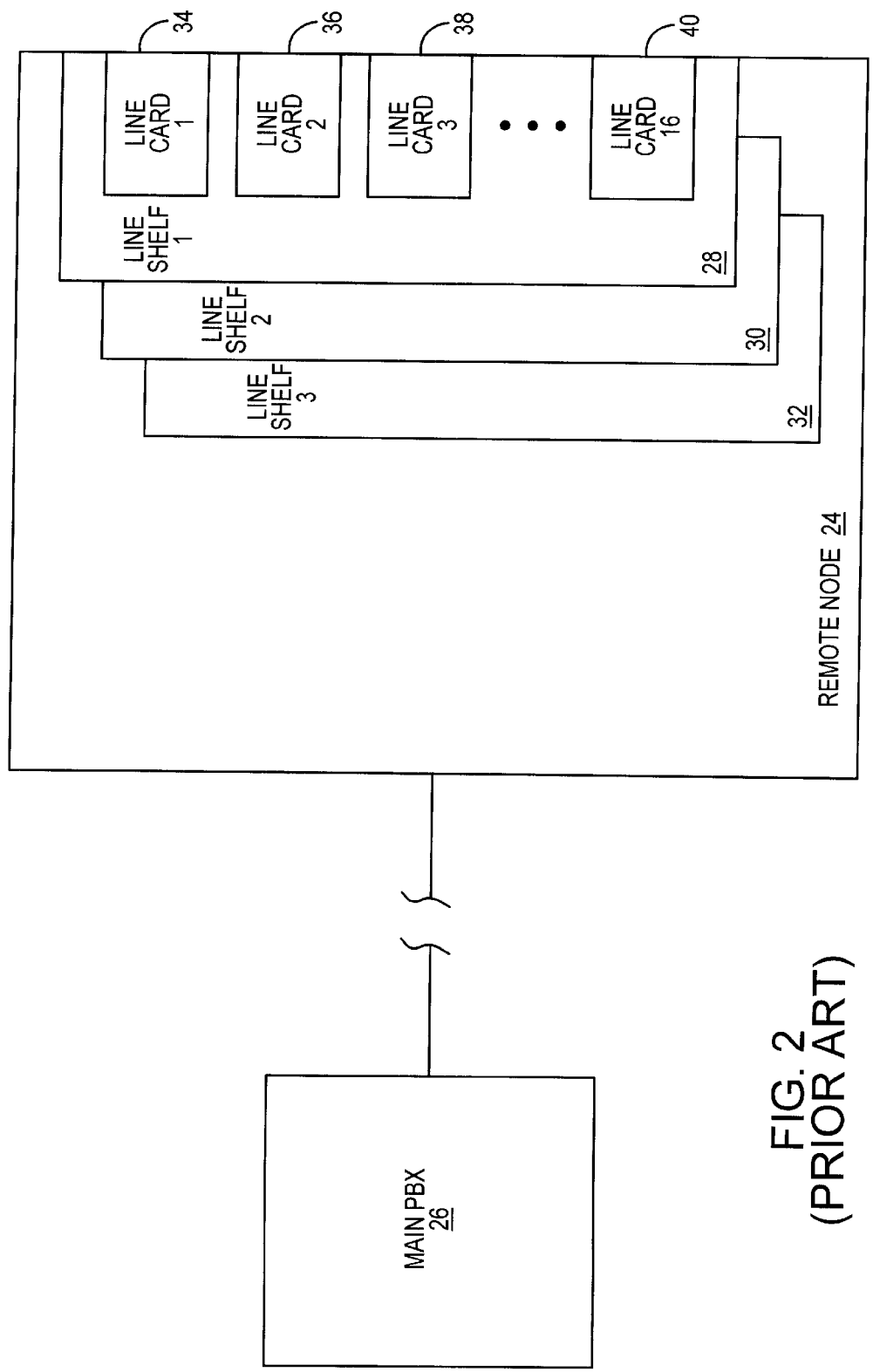
FIG. 2 is an expanded view of a main PBX that is connected to a remote node in accordance with the prior art.
Figure 3:
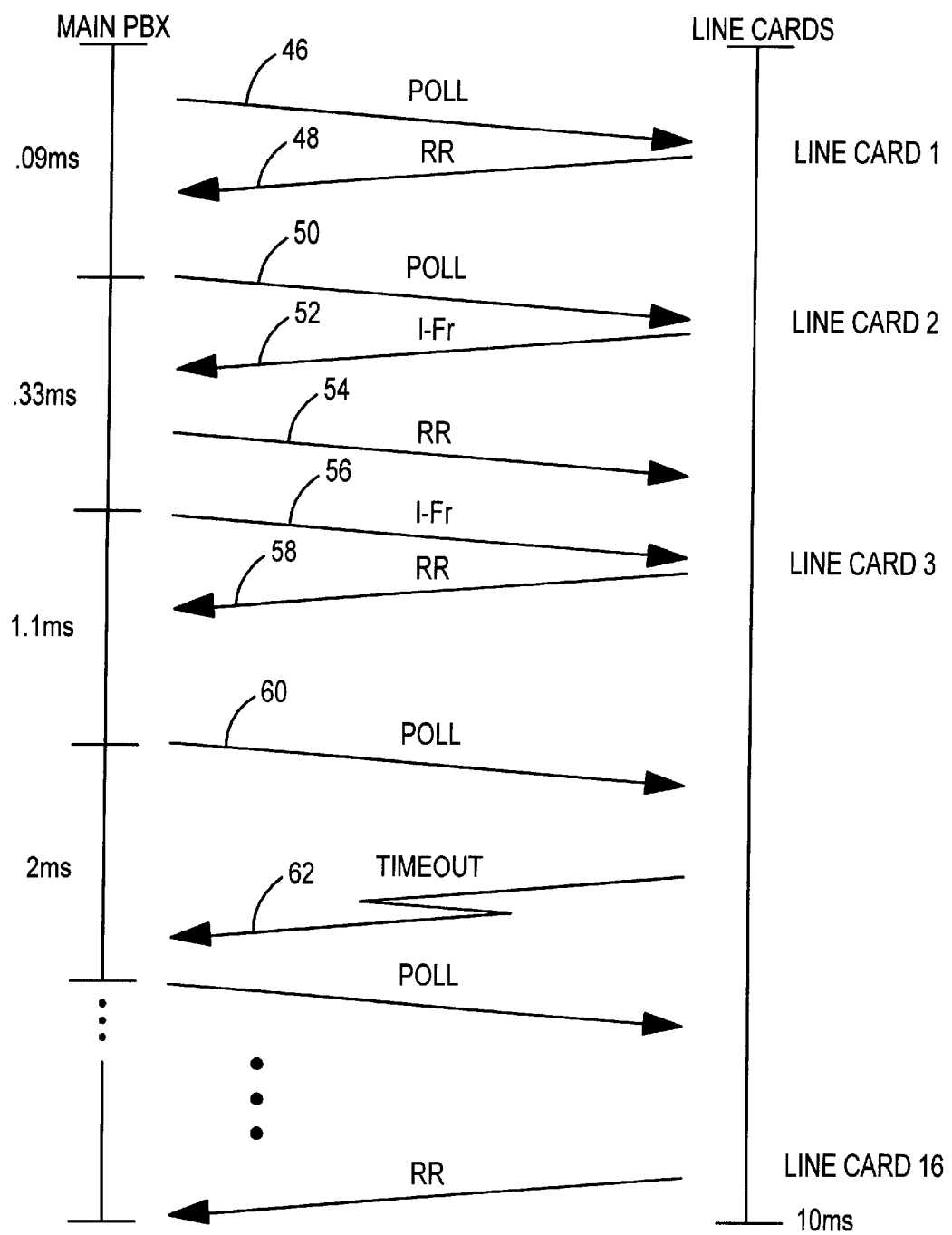
FIG. 3 is a depiction of a prior art HDLC signaling cycle that takes place between the main PBX and the line cards as shown in FIG. 2.
Figure 4:
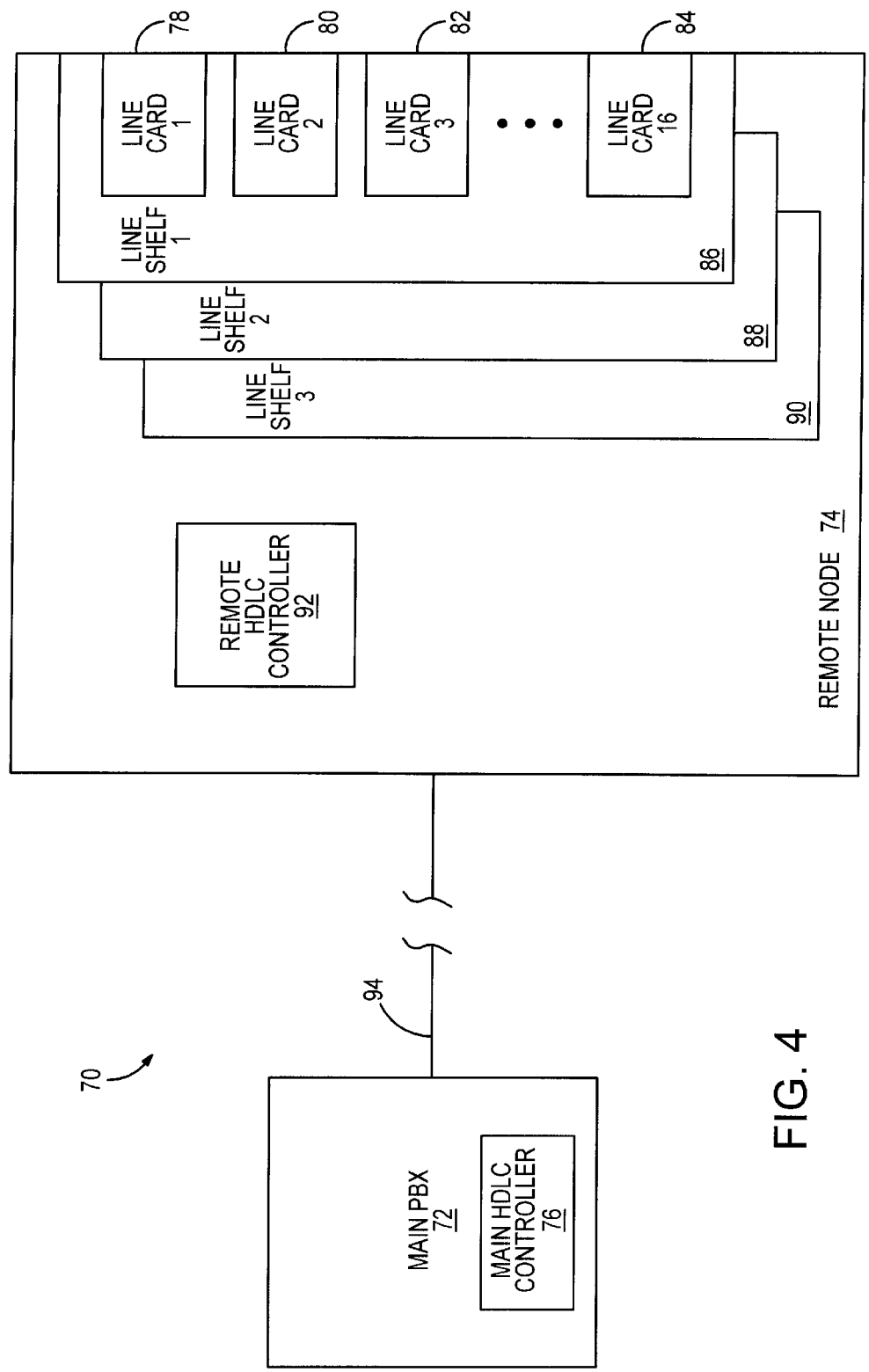
FIG. 4 is a depiction of a preferred main PBX and remote node that are configured to communicate in accordance with the invention.

FIG. 4 is a depiction of a preferred master and slave communications system 70 that is configured to communicate in accordance with the invention. The master and slave communications system is a packet-based system that includes a main PBX 72 and a remote node 74. The preferred main PBX includes a main HDLC controller 76, which is described in detail below. The preferred remote node includes sixteen line cards 78, 80, 82, and 84 on each of three line shelves 86, 88, and 90 and a remote HDLC controller 92, which is described in detail below. The main PBX is typically connected to a public switched telephone network (not shown), although this is not critical to the invention.

The main PBX 72 is connected to the remote node 74 by either a physical or a wireless communications link 94. The link 94 may be a T1 or dedicated optical fiber communications link. The remote HDLC controller 92 and the line cards 78–84 are preferably coupled to each other directly through circuit board connections. The invention is particularly advantageous if the link between the main PBX and the remote node has relatively long delay, as compared to the connections between the remote HDLC controller and the line cards. Although the preferred embodiment is described with reference to a PBX system, the invention can also be applied to other types of communications networks.

Figure 5:
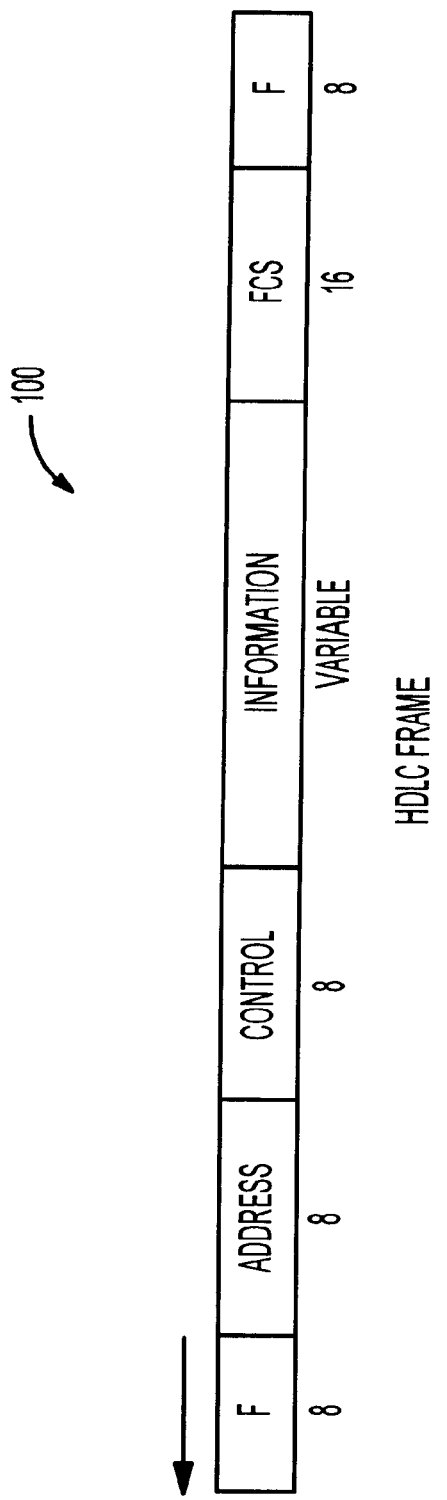
FIG. 5 is a depiction of an example HDLC frame as known in the prior art.

At the data link layer, or layer 2, of the OSI model, the main PBX 72, the remote node 74, and the line cards 78–84 preferably communicate according to HDLC protocol, although other data link layer protocols can be used. Under HDLC protocol, the main PBX is often referred to as the primary station, or the master station, and the line cards are often referred to as the secondary stations, or the slave stations. As will be described, the remote node acts as an intermediate station that enhances frame transmission. According to HDLC protocol, data is exchanged between the primary station (main PBX) and the secondary stations (line cards) via HDLC frames. A protocol-compliant HDLC frame 100 is depicted in FIG. 5 and includes two flag (F) fields, an address field, a control field, an information or user data field, and a frame check sequence (FCS) field. The number of bits typically associated with each field in the frame is identified below each field, and the arrow above the left end of the frame indicates the direction of transmission.

The beginning and ending flag fields of the HDLC frame 100 contain bit patterns that allow time for the frame transmission between the primary and secondary stations to be stabilized. The flag fields also allow the receiving station to synchronize to the incoming signal in preparation for receiving real data. The address field contains the HDLC address of the station that is to receive the current HDLC frame. The control field identifies the type of HDLC frame which is being transmitted. In addition to identifying the type of HDLC frame, the control field identifies various other control functions. The information field, which occurs only in information frames and unnumbered frames, is used to transmit user-specific data. The information field is variable in length, depending on the amount of user-specific data that is being transmitted. The frame check sequence field contains error checking information which is used to verify the accuracy of the data within each frame.

In accordance with HDLC protocol, the number of frames that can be sent from a primary station to a secondary station without an acknowledgment from the secondary station is either 7 or 127, depending on the number of bits in the control field that have been dedicated to count the frames. Modulo-8 transmission allows 7 frames to be sent without an acknowledgment, while modulo-128 allows 127 frames to be sent without an acknowledgment.

Referring back to FIG. 4, the main HDLC controller 76 is a subsystem that generates combined-message frames which are transmitted from the main PBX 72 to the remote node 74. The combined-message frames carry, in a single frame, the information necessary to create all of the frames that are sent to the individual slave systems. The information field of a combined-message frame is formed by combining a series of address-specific messages. The address-specific messages are generated by the main HDLC controller and include abbreviated versions of polling, acknowledge, and information frames. Specifically, the address-specific messages carry enough information so that frames of data complying with HDLC protocol can be generated.

Figure 6:
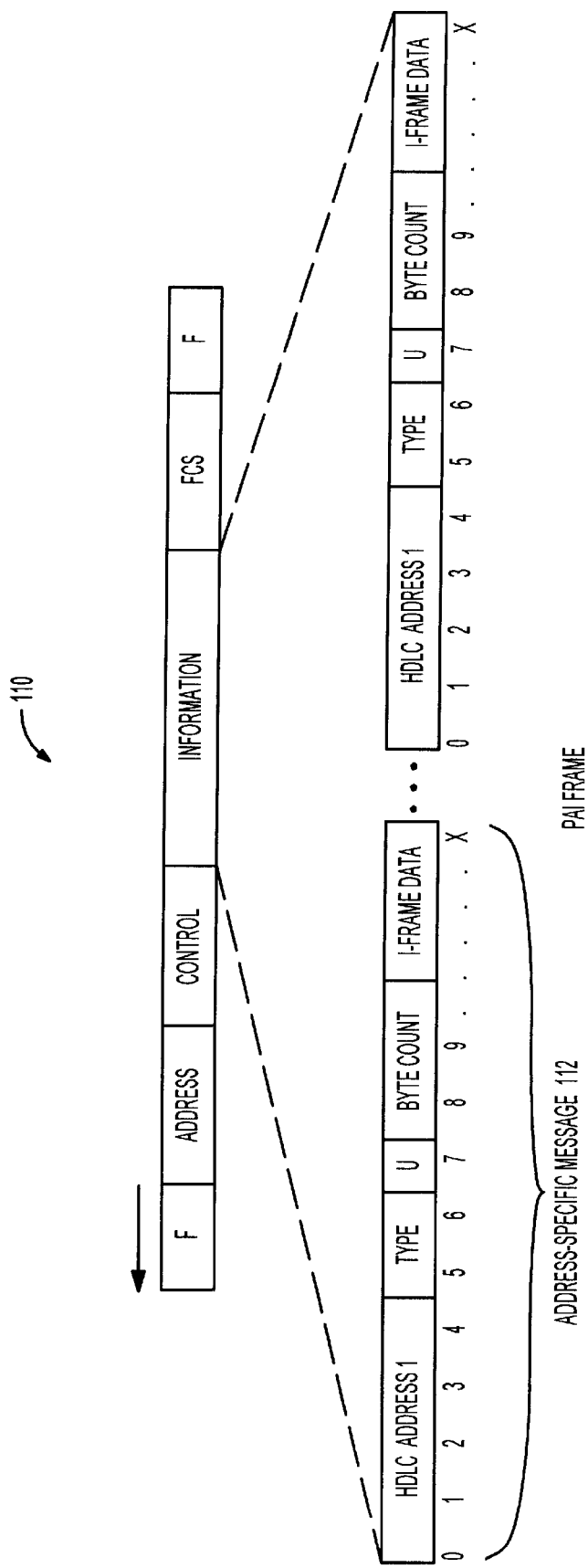
FIG. 6 is a depiction of a preferred HDLC frame that includes address-specific messages in accordance with the invention.

FIG. 6 depicts a combined-message frame 110 with an expanded view of the information field. The combined-message frame is used to transmit address-specific poll, acknowledge, and information (PAI) messages from the main PBX to the remote node. Because the combined-message frame includes poll, acknowledge, and information messages, the combined-message frame is also referred to as a PAI frame. In a preferred embodiment, a PAI frame includes all of the standard HDLC fields, with the information field including the address-specific messages.

In the preferred embodiment there is one address-specific message for each of sixteen line cards in one PAI frame. As shown within the bracket in FIG. 6, each address-specific message 112 within the information field of the PAI frame includes an HDLC address field, a type field, an unused field, and optional byte count and I-Frame data fields. The HDLC address field of an address-specific message identifies the HDLC address of the target line card. The type field identifies a type of frame that is to be generated for the target line card. The type of frame is preferably either a polling frame, an acknowledge frame, or an information frame. The unused field can be customized for various particular uses. If the address-specific message is an information message, then the message also includes the byte count field and the I-Frame data field. If the type field indicates that the address-specific message is a poll or an acknowledge frame, the byte count field and the I-Frame data field are not necessary. The byte count field indicates the number of bytes in the I-Frame data field and the I-Frame data field contains the specific data that is to be transmitted.

Referring again to FIG. 4, the preferred remote node 74 includes the remote HDLC controller 92. The remote HDLC controller is a subsystem that receives incoming PAI frames from the main PBX 72 in the HDLC format shown in FIG. 6. Upon receiving a PAI frame, the remote HDLC controller separates out the address-specific messages for the sixteen line cards (peripherals) associated with the target line shelf. Referring to the address-specific message 112 for HDLC address 1, the remote HDLC controller looks at the HDLC address field to determine the target line card for the frame.

The remote HDLC controller then looks at the type field to determine the type of message that is being transmitted. If the type field in the address-specific message indicates a polling frame, then the remote HDLC controller generates a polling frame. The polling frame is generated in HDLC format with all of the fields that are required for a standard HDLC frame as shown in FIG. 5. Because the remote HDLC controller knows the HDLC address of the target line card and the message type, the proper HDLC frame, including the flag, control, and frame check sequence fields can be quickly and easily constructed by the remote HDLC controller. When the address-specific message indicates a polling frame, the byte count and the I-Frame data fields are not necessary.

If the type field in the address-specific message 112 indicates an acknowledge, or receive ready (RR), frame, then the remote HDLC controller 92 generates an acknowledge frame. The acknowledge frame is generated in HDLC format with all of the fields that are required for a standard HDLC frame 100, as shown in FIG. 5. Again, the byte count and I-Frame data fields are not necessary.

If the type field in the address-specific message 112 indicates an information frame, then the remote HDLC controller 92 generates an information frame. The information frame is generated in HDLC format with all of the fields that are required for a standard HDLC frame 100, as shown in FIG. 5. Data that is to be placed in the control and information fields of the HDLC frame is obtained from the byte count and I-Frame data fields of the address-specific message. The process of generating HDLC frames from the address-specific messages is performed for each line card until all of the address-specific messages in the combined-message frame have been processed, where "processed" means sending out the address-specific message and collecting the address-specific response for each line card. Because the remote HDLC controller does not perform any error checking or initiate the generation of new HDLC frames, no significant processing time is required by the remote HDLC controller to generate, transmit, and/or receive the address-specific HDLC frames.

Figure 7:
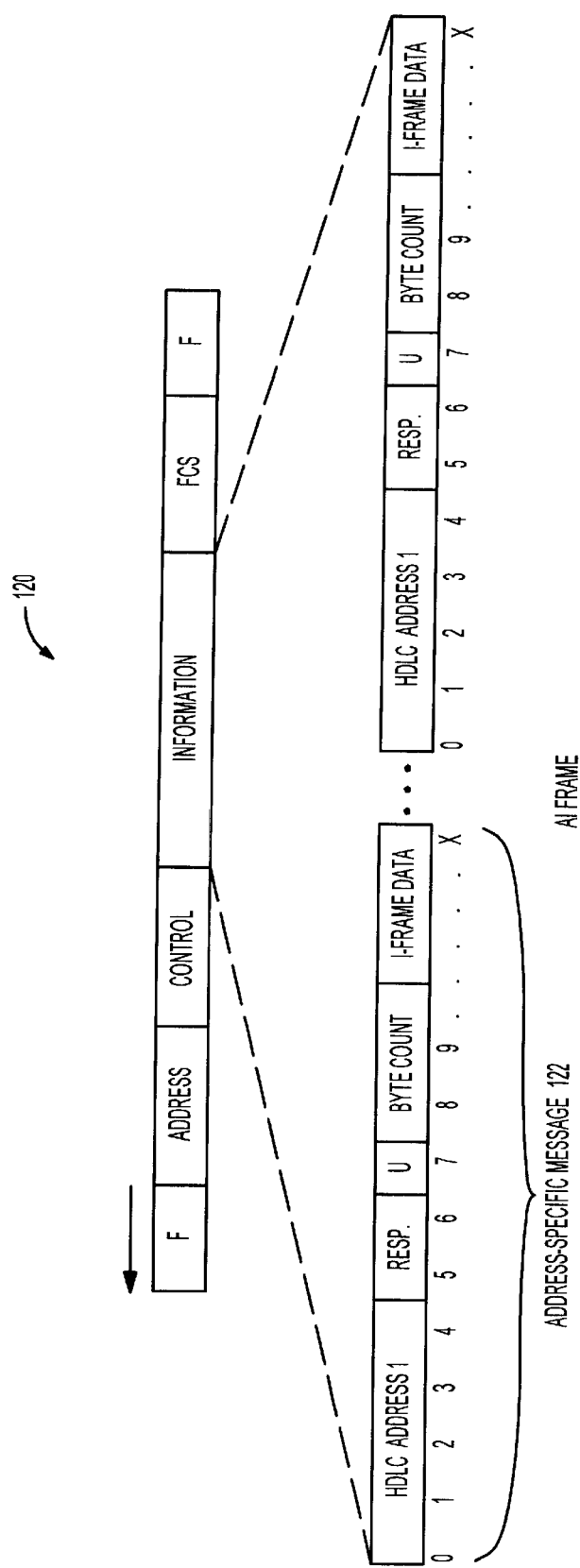
FIG. 7 is a depiction of another HDLC frame that includes address-specific messages in accordance with the invention.

In addition to managing the incoming PAI frames, the remote HDLC controller 92 also manages the generation of outgoing combined-message frames 120. The generation of outgoing combined-message frames is essentially the reverse operation of generating the PAI frames. That is, address-specific HDLC frames received by the remote HDLC controller from the line cards 78–84 are used to generate address-specific messages 122. Referring to FIG. 7, address-specific messages are combined to create a second combined-message frame, also referred to as an acknowledge and information (AI) frame. Each address-specific message within an AI frame includes an HDLC address field, a response field, an unused field, and optional byte count and I-Frame data fields. The fields in the AI frame are equivalent to the fields in the PAI frame except that the type field is referred to as the response field. The response field indicates the type of message that is being transmitted from a line card to the main PBX. Once the address-specific messages are generated for each of the sixteen peripherals, the AI frame is created for transmission to the main controller. As with the PAI frame, creating the AI frame involves generating the flag, address, control, and frame check sequence fields, and placing all of the address-specific messages into the information field.

Figure 8:
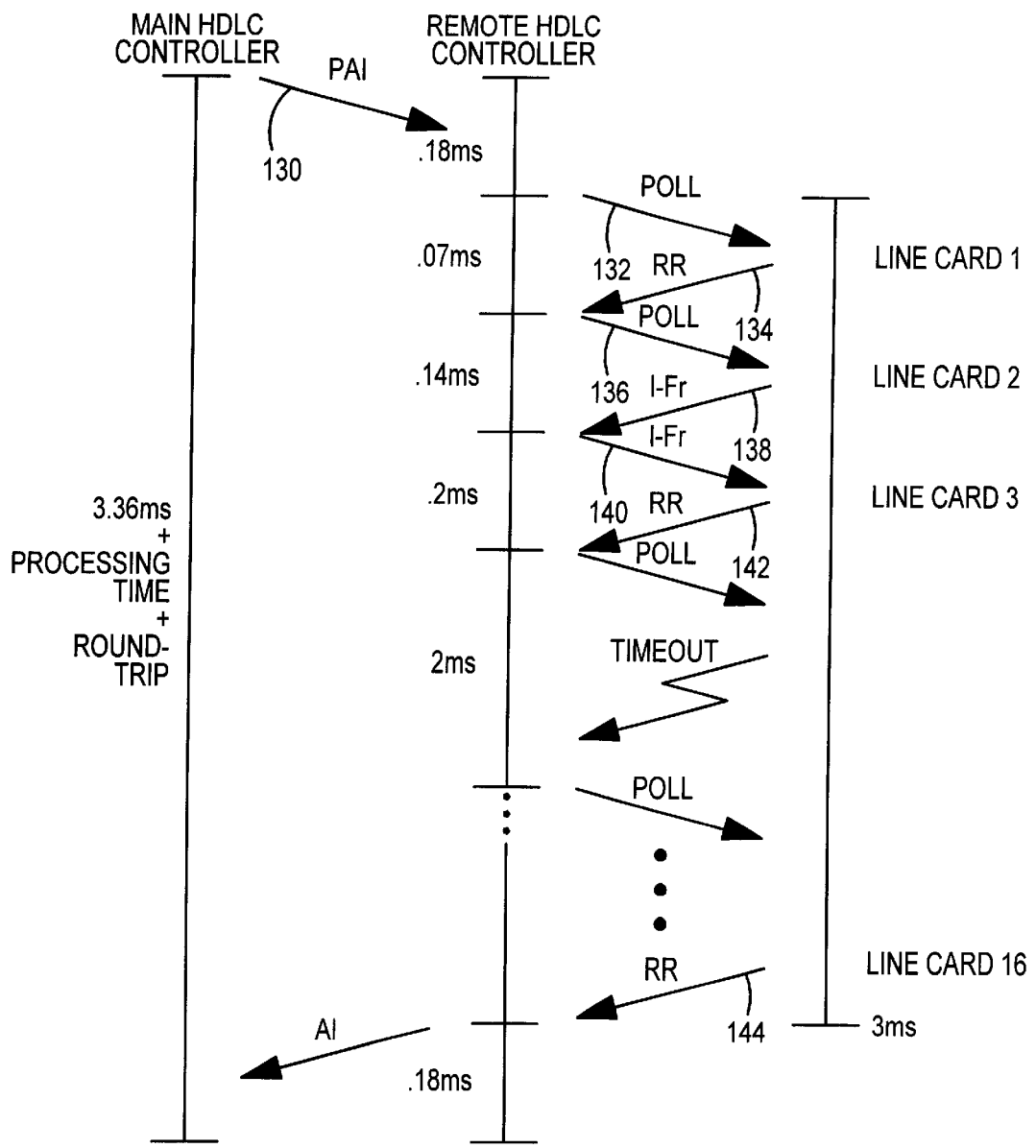
FIG. 8 is a depiction of an exemplary signaling cycle that occurs between the main HDLC controller, the remote HDLC controller, and the line cards of FIG. 4 in accordance with the invention.

Overall operation of the system for performing data link layer communications between the main PBX 72 and line cards 78–84 is described with reference to FIGS. 4, 6, 7 and 8. FIG. 8 is an example of the order and timing with which HDLC frames are exchanged between the main HDLC controller 76, the remote HDLC controller 92, and the line cards. Referring to FIG. 8, the main HDLC controller generates a PAI frame (a first combined-message frame 110) as shown in FIG. 6, and transmits the PAI frame 130 from the main PBX to the remote node 74 via a relatively long delay communications link. The time required to modulate the frame onto the communications link is estimated at 0.18 ms, however the transmission time on the communications link is dependent on the type of link and the length of the link.

The remote HDLC controller 92 within the remote node 74 receives the PAI frame, and utilizes the address-specific messages within the PAI frame to build HDLC-compliant address-specific frames for each of the line cards. After the remote controller builds the first address-specific HDLC-compliant frame, the HDLC frame is sent to the first line card via a relatively short delay communications link.

For example, referring to FIG. 8, the first address-specific frame is a polling (POLL) frame 132 that is sent from the remote HDLC controller to line card one. In response to the polling frame, line card one generates and transmits an acknowledge, or receive ready (RR), frame 134 back to the remote HDLC controller and the entire exchange is estimated to take 0.07 ms. The receive ready frame generated by the line card one (slave system) is also in HDLC format. The address-specific frame received from line card one is utilized to generate an address-specific message. The address-specific message is temporarily stored for inclusion in an AI frame that will be generated.

After the communication with line card one is complete, a communication with line card two begins. A polling frame 136 is generated by the remote HDLC controller 92 utilizing the address-specific message relating to line card two. The polling frame is transmitted to line card two and an information frame (I-Fr) 138 is transmitted back to the remote HDLC controller in response to the polling frame. The entire exchange is estimated to take 0.14 seconds. The information frame, which is in HDLC format, is utilized to generate an address-specific message. The address-specific message is temporarily stored for inclusion in the AI frame that will be generated.

After the communication with line card two is complete, a communication with line card three begins. An information frame (I-Fr) 140 is generated at the remote HDLC controller utilizing the address-specific message relating to line card three. The information frame is transmitted to line card three and a receive ready (RR) frame 142 is transmitted back to the remote HDLC controller in response to the information frame. The entire exchange is estimated to take 0.20 ms. The receive ready frame is utilized to generate an address-specific message. Again, the address-specific message is temporarily stored for inclusion in the AI frame that will be generated.

The exchange of HDLC frames continues until the last address-specific frame 144 is transmitted from line card sixteen to the remote HDLC controller 92. After receiving the last address-specific frame, the remote HDLC controller generates the last address-specific message. The HDLC controller then combines all of the address-specific messages to build an AI frame (second combined-message frame 120) as shown in FIG. 7. The AI frame includes all of the newly created address-specific messages in the information field. The AI frame is then transmitted from the remote node 74 to the main PBX 72 over the long delay communications link, thereby completing one transmission cycle. Again, the time required to modulate the frame onto the communications link is estimated at 0.18 ms, however the transmission time of the frame through the communications link is dependent on the type of link and the length of the link. Referring to FIG. 8, the total time required for a complete cycle includes 3.36 ms of known frame transfer time (0.18 ms+3 ms+0.18 ms), plus frame processing time at the main PBX, plus the round trip transmission time for the master frames between the main PBX and the remote node.

Referring back to FIG. 4, the communication link 94 between the main PBX 72 and the remote node 74 is a remote link that consists of communications mediums such as a T1 line or an optic fiber. The communications link between the remote HDLC controller and the line cards consists of a local link such as circuit board connections and/or short wire connections. The transfer times for HDLC frames between the main PBX and the remote node are much longer than the transfer times for HDLC frames between the remote HDLC controller 92 and the line cards 78–84. By combining all of the information that is to be communicated between the main PBX and the line cards into combined-message frames, the number of frames transmitted over the slower remote communications link is minimized and frame transmissions over the faster local communications links are maximized. Specifically, in the preferred system only two HDLC frames are transmitted over the remote communications link, whereas conventional systems would require thirty-two HDLC frames to be transmitted over the remote communications link to accomplish the same result.

The remote communications link 94 is also more susceptible to unanticipated delay than the local communications links that exist between the remote HDLC controller and the line cards. Minimizing the number of frames that are sent over the remote communication link reduces unanticipated delay in the system and enables the remote node 74 to be located at a further distance from the main PBX 72.

In addition to reduced transmission times, processing time and interrupt time within the main HDLC controller 76 are often reduced when the described protocol is implemented. Processing and interrupt time within the main HDLC controller are reduced because the main HDLC controller is only generating one master frame per cycle for transmission and receiving one master frame per cycle from the secondary station. Because of the processing and interrupt time savings, it is also advantageous to implement the transmission method into systems in which the primary station and the secondary stations are local to each other.

Figure 9:
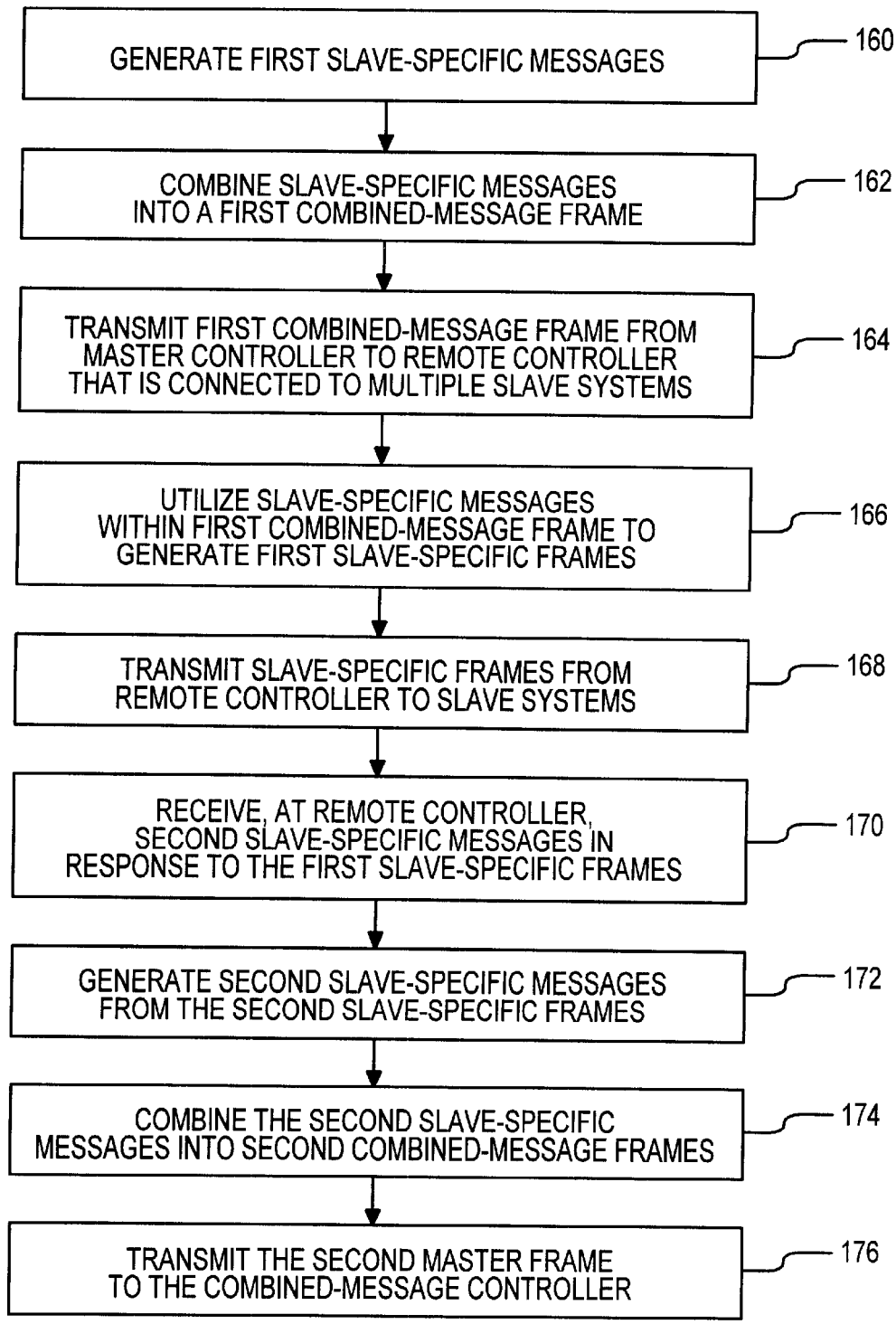
FIG. 9 is a preferred process flow diagram for improving performance in a master and slave communications system in accordance with the invention.

FIG. 9 is a depiction of a preferred method for improving performance in a master and slave type communications system. In a step 160, first slave-specific messages are generated for multiple slave systems. In a step 162, the first slave-specific messages are combined into a first master frame. In a step 164, the first master frame is transmitted from a master controller to a remote controller that is connected to the slave systems. In a step 166, the slave-specific messages within the first master frame are utilized to generate first slave-specific frames for the slave systems. In a step 168, the first slave-specific frames are transmitted from the remote controller to respective slave systems. In a step 170, second slave-specific frames are received from the slave systems in response to the first slave-specific frames. In a step 172, second slave-specific messages are generated from the second slave-specific frames. In a step 174, the second slave-specific messages are combined into a second master frame. In a step 176, the second master frame is transmitted to the master controller. Although OSI data link layer protocol is desired with regard to the preferred embodiment, the invention can be implemented in other point-to-point transmission protocols.

What is claimed is:

1. A method for improving performance in distributed master and slave type communications systems comprising the steps of:

generating first slave-specific messages for a plurality of slave systems, each slave-specific message having a target slave system;

combining said first slave-specific messages into a first combined-message frame;

transmitting said first combined-message frame over a communications link having a master system at a first end and said target slave systems at a second end;

utilizing said slave-specific messages within said first combined-message frame to generate first slave-specific frames, each first slave-specific frame having a target slave system;

transmitting said first slave-specific frames to respective said target slave systems;

storing, at said second end, a plurality of second slave-specific frames received from said target slave systems in response to said first slave-specific frames;

generating a second combined-message frame that is representative of said plurality of second slave-specific frames; and transmitting said second combined-message frame to said first end of said communications link.

2. The method of claim 1 wherein said first slave-specific frames and said second slave-specific frames are generated to include polling frames, acknowledge frames, and information frames.

3. The method of claim 2 wherein said first combined-message frame, said first slave-specific frames, said second slave-specific frames, and said second combined-message frame are created in accordance with high-level data link control (HDLC) protocol.

4. The method of claim 1 further comprising a step of generating a second slave-specific message from each second slave-specific frame, said second combined-message frame being a combination of said second slave-specific messages, wherein said steps of generating said first and said second slave-specific messages include substeps of indicating a link layer protocol address and a frame type.

5. The method of claim 4 wherein said steps of combining said first slave-specific messages into said first combined-message frame and combining said second slave-specific messages into said second combined-message frame include steps of entering said first and second slave-specific messages into respective information fields of said first and second combined-message frames.

6. The method of claim 5 wherein said first combined-message frame, said first slave-specific frames, said second slave-specific frames, and said second combined-message frame comply with a specific data link layer protocol, and wherein said first slave-specific messages and said second slave-specific messages are incompatible with said specific data link layer protocol.

7. The method of claim 1 wherein said step of transmitting said first combined-message frame and said step of transmitting said second combined-message frame are steps of transmitting said first and second combined-message frames over a relatively long delay communications link, and wherein said step of transmitting said first slave-specific frames includes a step of transmitting said first slave-specific frames to said slave systems over relatively short delay communications links.

8. The method of claim 1 wherein said step of combining said first slave-specific messages is executed at a master controller located in a main PBX, and wherein said steps of generating said first slave-specific frames and said second combined-message frame are executed at a remote controller located in a remote node, and said target slave systems being line cards located within said remote node.

9. The method of claim 1 wherein said steps of transmitting said first slave-specific frames and storing said second slave-specific frames are performed sequentially from one slave system to a next slave system.

10. A system for performing data link layer communications between master and slave systems comprising:
  a master system;
  a remote node, connected to said master system by a communications link;
  a plurality of slave systems connected to said remote node;
  means, located within said master system, for generating first slave-specific messages for said slave systems, and for generating a first combined-message frame of data containing said first slave-specific messages for transmission to said remote node;
  means, located within said remote node, for:
    (a) generating first slave-specific frames from said first slave-specific messages that are transmitted within said first combined-message frame;
    (b) generating second slave-specific messages from second slave-specific frames that are received from said slave systems in response to said first slave-specific frames; and
    (c) generating a second combined-message frame for transmission to said master system such that said second combined-message frame includes said second slave-specific messages.

11. The system of claim 10 wherein said first combined-message frame, said first slave-specific frames, said second slave-specific frames, and said second combined-message frame are generated in accordance with a specific data link layer protocol, and wherein said first slave-specific frames and said second slave-specific frames include polling frames, acknowledge frames, and information frames.

12. The system of claim 11 wherein said frames are generated in accordance with high-level data link control (HDLC) protocol.

13. The system of claim 12 wherein said first and second combined-message frames include said first and second slave-specific messages within respective information fields.

14. The system of claim 13 wherein said master system is a main PBX and said slave systems are line cards located within said remote node.

15. The system of claim 14 wherein said communications link between said main PBX and said remote node has relatively long delay and wherein connections between said remote node and said line cards have relatively short delay.

16. The system of claim 15 wherein said main PBX, said remote node, and said line cards are packet-based communications systems.

17. The system of claim 10 wherein said communications link between said master system and said remote node is a relatively long delay link, and wherein said plurality of slave systems are connected to said remote node by relatively short delay communications links.

18. A method for improving performance in the exchange of data at the data link layer of a communications system comprising the steps of:
  generating an outgoing combined-message high-level data link control (HDLC) frame that includes outgoing slave-specific messages in an information field of said outgoing combined-message HDLC frame;
  transmitting said outgoing combined-message HDLC frame from a master system to a remote node;
  generating a plurality of slave-specific HDLC frames from said outgoing slave-specific messages that are transmitted to said remote node within said outgoing combined-message HDLC frame;
  transmitting a first one of said slave-specific HDLC frames from said remote node to a first slave system;
  receiving a first slave-system-generated HDLC frame from said first slave system in response to said first one of said slave-specific HDLC frames;
  transmitting a second one of said slave-specific HDLC frames from said remote node to a second slave system after said first slave-system-generated HDLC frame is received at said remote node;
  receiving a second slave-system-generated HDLC frame from said second slave system in response to said second one of said slave-specific HDLC frames;
  generating incoming slave-specific messages from said first and second slave-system-generated HDLC frames;
  generating an incoming combined-message HDLC frame that includes said incoming slave-system messages in an information field of said incoming combined-message frame; and
  transmitting said incoming combined-message HDLC frame from said remote node to said master system.

19. The method of claim 18 wherein said step of generating said outgoing combined-message HDLC frame includes a step of creating HDLC address and frame type fields within each of said outgoing slave-specific messages, and wherein said step of generating said incoming combined-message HDLC frame includes a step of creating HDLC address and frame type fields within each of said incoming slave-specific messages.

20. The method of claim 19 wherein:
  said step of transmitting said outgoing combined-message HDLC frame from said master system to said remote node includes a step of transmitting said outgoing combined-message HDLC frame via a relatively long delay communications link;
  said step of transmitting said first one of said slave-specific HDLC frames from said remote node to said first slave system includes a step of transmitting said first one of said slave-specific HDLC frames via a first relatively short communications link;
  said step of transmitting said second one of said slave-specific HDLC frames from said remote node to said second slave system includes a step of transmitting said second one of said slave-specific HDLC frames via a second relatively short delay communications link; and
  said step of transmitting said incoming combined-message HDLC frame from said remote node to said master system includes a step of transmitting said incoming combined-message frame via said relatively long delay communications link.

* * * * *